United States Patent [19]

Moulton

[11] 4,088,886
[45] May 9, 1978

[54] RADIATION THICKNESS GAUGE FOR SHEET MATERIAL

[75] Inventor: Richard B. Moulton, Pittsburgh, Pa.

[73] Assignee: Nucleonic Data Systems, Irvine, Calif.

[21] Appl. No.: 754,447

[22] Filed: Dec. 27, 1976

Related U.S. Application Data

[63] Continuation of Ser. No. 615,293, Sep. 22, 1975, abandoned.

[51] Int. Cl.² .................................................. G01N 23/20
[52] U.S. Cl. ................................... 250/277 R; 250/273
[58] Field of Search ............... 250/272, 277, 278, 273, 250/252

[56] References Cited

U.S. PATENT DOCUMENTS

| 2,988,641 | 6/1961 | Gough | 250/277 |
|---|---|---|---|
| 4,009,376 | 2/1977 | Faraguet | 250/252 |

*Primary Examiner*—Bruce C. Anderson
*Attorney, Agent, or Firm*—Harris, Kern, Wallen & Tinsley

[57] ABSTRACT

Apparatus and method for measuring thickness of sheet material, particularly in a rolling mill, and controlling a roll stand. An X-ray florescence analyzer for determining the components of the sheet material, a radiation thickness gauge with a calibration system for gauging material of varying composition, and a computer for calculating a calibration signal for the thickness gauge based on the output of the analyzer, with the thickness gauge output providing a measure of the thickness of the sheet material at the gauge and a control signal for controlling the roll stand.

8 Claims, 2 Drawing Figures

RADIATION THICKNESS GAUGE FOR SHEET MATERIAL

This is a continuation of application Ser. No. 615,293, filed Sept. 22, 1975.

BACKGROUND OF THE INVENTION

This invention relates to the measurement of thickness of sheet material, particularly sheet material as it moves through a rolling mill, and control of the rolling mill.

In the past, two approaches have been utilized in the measurement of sheet thickness. In lower speed mills, typically where the metal strip moves at a speed of 2,000 feet per minute and lower, mechanical thickness gauges are used. The mechanical gauges provide accurate and direct measurement of sheet thickness so long as uniform contact is maintained with the sheet. However as the speed increases, the feelers begin to bounce and ride off the sheet resulting in a practical upper limit of sheet speed for mechanical type thickness gauges.

Radiation type thickness gauges are used with the higher speed rolling mills, some of which operate in the range of 4,000 to 8,000 feet per minute. A conventional radiation thickness gauge utilizes a radiation source on one side of the sheet and a radiation detector on the opposite side. The radiation detector measures the radiation transmitted through the sheet in terms of counts, with the number of counts being a function of the mass absorption coefficient, the density and the thickness of the sheet. More specifically, the radiation at the detector is proportional to $e-\mu\rho^t$. Mu and Rho vary with the composition of the material, varying both with the specific component and the amount of the component present in the material. The conventional radiation thickness gauges consider the product of Mu and Rho to be a constant and a nominal value for this constant is provided for each alloy. For example, aluminum 2024 will have a first value for the constant, aluminum 3004 will have a second value, and aluminum 5082 will have a third value. When aluminum 2024 is being run through the rolling mill, the calibration knob of the thickness gauge is set to the calibration figure provided for this particular alloy. The calibration figure may be taken from a chart which provides the value for the nominal composition of the alloy. However this is not satisfactory for many situations since the amounts of the various constituents in the alloy will vary. Greater accuracy is achieved by taking a sample of the material and making a spectographic analysis in the laboratory providing a calibration figure for the sample. However this procedure has not been satisfactory because of large variations from ingot to ingot even though cast together, and from roll to roll even when rolled from the same ingot, as well as variations in composition within a roll. Errors as high as 15% in determining the Mu Rho product for a sample have been encountered.

Ordinarily a radiation thickness gauge utilizes an X-ray or gamma ray source such as an X-ray tube or a radioactive isotope. Attempts to reduce the error in gauging have led to the use of beta radiation sources for thickness gauges. However while the errors are reduced, the beta sources require positioning the source and detector very close to the moving sheet which is very undesirable.

It is an object of the present application to provide a new and improved radiation type thickness measuring apparatus and method particularly suited for high speed rolling mills which substantially reduces the errors of prior art systems while being operable with X-ray and gamma ray sources with relative wide spacing from the sheet being measured.

SUMMARY OF THE INVENTION

The thickness measuring system of the invention includes an X-ray florescence analyzer for analyzing the composition of the metal alloy forming the sheet material, and a radiation thickness gauge having a radiation source, a radiation detector and an electronics unit, and means for positioning the analyzer at the sheet of material and means for positioning the radiation source and detector on opposite sides of the sheet of material. The output of the thickness gauge varies with several factors including the thickness of the sheet and the composition of the material of the sheet. The components of the material may vary and the amount of the various components may vary. Calibration means is provided for the electronics unit of the thickness gauge to compensate for variations in composition of the material being gauged. Means for calculating the calibration based on the analysis of the X-ray florescence analyzer and the known mass absorption coefficient and density of the constituents provides a calibration signal to the electronics unit for automatically compensating the measurement for variation in composition.

The output may be recorded and/or displayed and may be used for automatically controlling a roll stand, as desired.

DESCRIPTION OF THE PREFERRED EMBODIMENT

Figure 2:
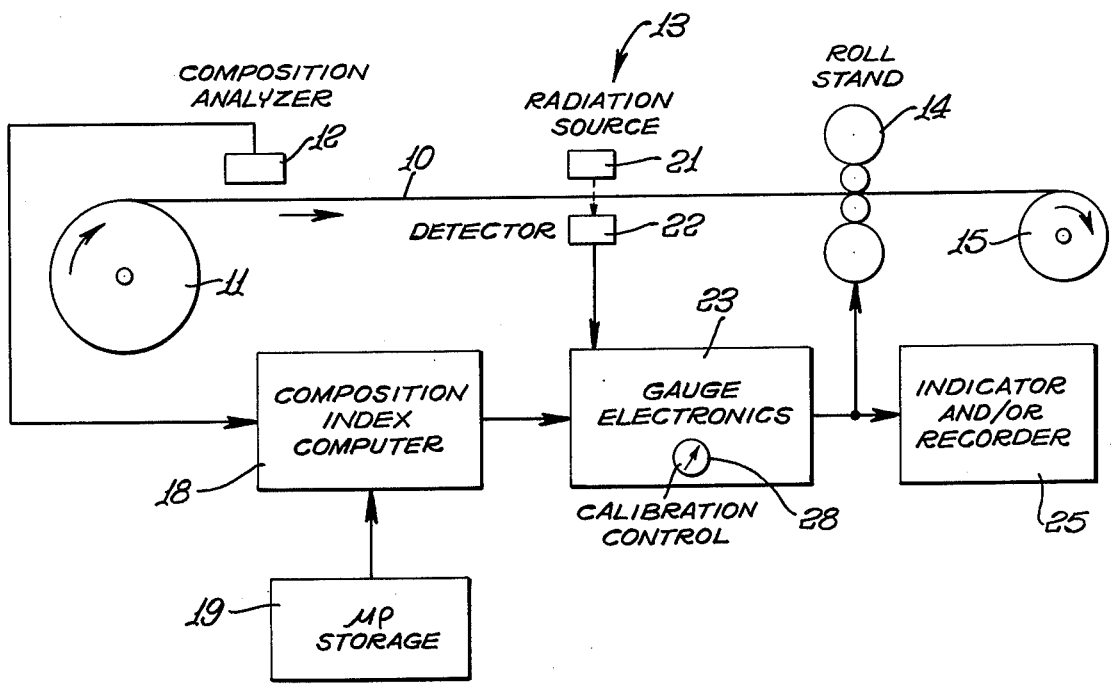
FIG. 2 is a diagram illustrating a thickness measuring and control system for a rolling mill and incorporating the presently preferred embodiments of the invention.

In the system of FIG. 2, a strip 10 of sheet material, typically an aluminum alloy, is fed from a roll 11 past a composition analyzer 12, a radiation thickness gauge 13, and a roll stand 14 to another roll 15. The system also includes a composition index computer 18 with a memory 19 for storing mass absorption coefficient (Mu) and density (Rho) data for the components of the various materials likely to be used in the rolling mill. The radiation thickness gauge 13 includes a radiation source 21, a detector 22, and an electronics unit 23. An indicator and/or recorder 25 may be provided for the thickness gauge output.

The thickness gauge 13 and roll stand 14 may be conventional, and the output of the thickness gauge may be used to automatically vary the rolling gap of the roll stand, or may be displayed to the operator who manually sets the gap of the roll stand.

The radiation arriving at the detector 22 is a function of the thickness of the strip 10 between the source and detector. The number of rays detected is proportional to $e-\mu\rho^t$, indicating that the radiation or measured output varies with mass absorption coefficient and density as well as thickness. Both Mu and Rho vary with the chemical composition of the metal alloy and in the conventional system, the product of Mu and Rho is determined ahead of time for a particular alloy and then assumed to be a constant value, so that the radiation at the detector is proportional to $e^{-kt}$, where $k$ is a constant.

Figure 1:
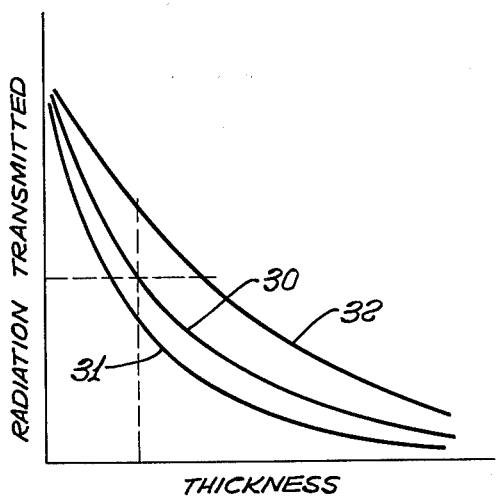
FIG. 1 is a set of curves illustrating the relationship between radiation transmitted in a radiation thickness gauge and thickness of the material.

A calibration arrangement is provided in the electronics unit of the conventional radiation thickness gauge and typically may be a potentiometer which varies a bias voltage in the circuit, with the potentiometer driven by a calibration control knob 28. When the operator is running a particular alloy, for example aluminum 2024, he obtains a calibration figure from a reference sheet and sets the knob 28 to this figure, thereby providing a specific constant value for the factor $k$. This selected figure may correspond to curve 30 of FIG. 1 which shows a set of calibration curves for a radiation thickness gauge. The curve 30 provides a thickness measurement for each value of radiation detected. However, if the composition of the sheet differs from the nominal composition used in selecting the constant for the calibration, there can be a substantial error in the thickness indicated. If the actual Mu Rho product for the material being rolled is greater than the nominal value for the type of material, the instrument will be operating on a curve such as curve 31, which would require a different calibration setting for an accurate thickness measurement. Similarly, a material with an actual Mu Rho product lower than the nominal figure would be operating on another curve such as the curve 32.

The system of the present invention provides for direct analysis of the actual material being rolled, and adjustment of the thickness gauge for this particular material. The composition analyzer 12 may be a conventional X-ray florescence analyzer which provides as an output, the identification of the components of the metal alloy and a measure of the quantity of each component, typically in percent. While the instrument is referred to as an X-ray florescence analyzer, any source of X-ray or gamma radiation may be utilized including an X-ray tube or a radioactive isotope, and the phrase "X-ray florescence analyzer" as used in this specification and claims is intended to cover all such instruments.

The composition analyzer 12 may be used to analyze the strip of material at the time it is threaded into the mill, or may be used to continuously analyze the material as the mill operates. The analyzer output in the form of the composition of the material is fed into the computer 18 which calculates the Mu Rho product for the metal alloy, using the Mu and Rho data for the various components from the memory unit 19. Typically the computer will calculate the product of Mu, Rho and percent for each element in the composition, and then sum these products to provide the total Mu Rho product for the particular material. This total Mu Rho product provides the calibration information for the electronics unit 23. The figure could be displayed by the computer and the operator could then manually set the knob 28 to the particular value. However it is preferred to have the computer provide the output as a voltage which functions as a bias voltage in the electronics unit in the same manner as the bias voltage from the calibration control knob.

In the preferred embodiment, the computer calculates a ratio known as the composition index, which is the ratio of the Mu Rho product for the particular alloy in the rolling mill and the Mu Rho product for a standard material. When aluminum alloys are being rolled, pure aluminum is preferred as the standard material. Similarly, when other material such as copper or steel are being rolled, a pure copper or a pure iron is preferred for the standard. Another advantage of the system of the present invention is that the computer output whether in terms of a total Mu Rho product or a composition index provides an indentification of the particular alloy in the mill. For example, if the operator is supposed to be running a particular alloy, he knows that the Mu Rho product or the composition index for this alloy should be approximately a known figure. If the actual measurement varies from this nominal figure by a relatively small amount, the proper material has been fed into the mill. However if the actual measurement differs from the nominal figure by a relatively large amount, the operator is given an indication that the wrong material probably has been used.

The system of the invention provides for direct measurement of the composition of the actual material being rolled and thereby provides the actual Mu Rho product for the specific material rather than an estimated value, thereby eliminating this source of error in the thickness measurement. The system is particularly suited for use with high speed mills since no contact with the moving strip is required and a relatively wide gap may be utilized with the source and detector. While the system has been described as used with a rolling mill, it will be understood that the thickness measuring system is not limited to rolling mills and can be utilized for sheet thickness measurement in other environments.

I claim:

1. In a thickness measuring system for sheet material, the combination of:
   an X-ray fluorescence analyzer for analyzing the composition of a metal alloy by identifying components of the alloy and indicating the amount of each component in the alloy;
   means for positioning said analyzer at a sheet of the metal alloy;
   a radiation thickness gauge having a radiation source, a radiation detector, and an electronics unit having said detector output as an input and providing an output varying as a function of the input from said detector, said electronics unit including calibration means for varying the relation between the output and input thereof;
   means for positioning said source and detector on opposite sides of the sheet for directing radiation from said source through the sheet to said detector so that the detector output varies as a function of the thickness of the sheet;
   memory means for storing mass absorption coefficient and density data for various metal alloy components;
   a computer having said analyzer alloy component identification and amount output and said memory means data as inputs for calculating an output which varies as a function of the composition of the sheet at said analyzer and providing said computer output as a calibration signal for said calibration means, said computer including means for summing the products of the amount of each component of the alloy and the mass absorption coefficient and density of such component providing a total product for the metal alloy of the sheet; and
   means for varying said calibration means as a function of said calibration signal.

2. A system as defined in claim 1 including means for connecting said calibration signal to said calibration means for automatically varying the relation between the output and input of said electronics unit as a function of said calibration signal.

3. A system as defined in claim 2 wherein said calibration signal is in the form of an electrical voltage and is connected to said electronics unit to vary the bias of a component thereof.

4. A system as defined in claim 1 including a thickness indicator and means for connecting said electronics unit output to said indicator.

5. A system as defined in claim 1 including:
a roll stand;
means for moving the sheet between said source and detector and through said roll stand;
thickness control means for varying the rolling gap in said roll stand; and
means for connecting said electronics unit output to said thickness control means for automatically varying the rolling gap as a function of said electronics unit output.

6. A system as defined in claim 1 wherein said calibration signal is a ratio of the mass absorption coefficient and density of the sheet and the mass absorption coefficient and density of a standard metal.

7. A system as defined in claim 1 wherein said computer further includes means for calculating the ratio of said total product and a reference figure providing a composition index figure, and generating a voltage as the computer output varying as a function of the composition index figure.

8. A method of controlling thickness of sheet material in a rolling mill, including the steps of:
passing the sheet material between the source and detector of a radiation thickness gauge and through a roll stand;
analyzing the sheet material to identify components thereof and measure the amount of each component in the material;
varying the rolling gap of the roll stand as a function of the output of the thickness gauge;
computing a composition figure based on the mass absorption coefficient and density of the components and amounts of such components in the sheet material by calculating the product of the amount of each component present and the mass absorption coefficient and density of such component, summing the products, and calculating the ratio of the summed products and a reference figure; and
changing the calibration setting of the thickness gauge as a function of the computed composition figure.

* * * * *